(12) United States Patent
Hasegawa et al.

(10) Patent No.: US 11,697,329 B2
(45) Date of Patent: Jul. 11, 2023

(54) VEHICLE DOOR STRUCTURE

(71) Applicant: HONDA MOTOR CO., LTD., Tokyo (JP)

(72) Inventors: Atsushi Hasegawa, Wako (JP); Yoshihiro Fujimura, Tokyo (JP); Yasuhisa Egawa, Tokyo (JP); Takuro Nishida, Tokyo (JP); Yumi Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,725

(22) Filed: Feb. 26, 2022

(65) Prior Publication Data

US 2022/0314756 A1    Oct. 6, 2022

(30) Foreign Application Priority Data

Mar. 31, 2021   (JP) ................................ 2021-059323

(51) Int. Cl.
*B60J 5/04*    (2006.01)

(52) U.S. Cl.
CPC ............. *B60J 5/0444* (2013.01); *B60J 5/043* (2013.01)

(58) Field of Classification Search
CPC ........ B60J 5/042; B60J 5/0422; B60J 5/0423; B60J 5/0427; B60J 5/043; B60J 5/0437; B60J 5/0438; B60J 5/0443; B60J 5/0444; B60J 5/0448; B60J 5/0451; B60J 5/0456; B60J 5/0461
USPC ...................................................... 296/146.6
See application file for complete search history.

(56) References Cited

U.S. PATENT DOCUMENTS

| 6,039,387 A * | 3/2000 | Choi ...................... B60J 5/0427 296/187.12 |
| 6,302,474 B1* | 10/2001 | Drysdale ................ B60J 5/0441 296/5 |
| 2002/0171260 A1* | 11/2002 | Schneider .............. B60J 5/0452 296/146.6 |
| 2015/0258878 A1 | 9/2015 | Sugiyama |

FOREIGN PATENT DOCUMENTS

| CN | 203543600 U | | 4/2014 | |
| CN | 109515128 A | * | 3/2019 | ............ B60J 5/0443 |
| CN | 111301123 A | * | 6/2020 | |
| JP | H05-246243 A | | 9/1993 | |
| JP | 2003-211961 A | | 7/2003 | |
| JP | 2011-110945 A | | 6/2011 | |
| JP | 2015-174575 A | | 10/2015 | |

OTHER PUBLICATIONS

Japanese Office Action received in corresponding Japanese Application No. 2021-059323 dated Aug. 30, 2022 with English translation (10 pages).

* cited by examiner

*Primary Examiner* — Joseph D. Pape
*Assistant Examiner* — Veronica M Shull
(74) *Attorney, Agent, or Firm* — Rankin, Hill & Clark LLP

(57) ABSTRACT

A vehicle door structure includes: a horizontal beam arranged inside a door of a vehicle to extend in a vehicle front-rear direction; and a vertical beam arranged inside the door to extend in a vehicle up-down direction, wherein a vehicle front-side end and a vehicle rear-side end of the horizontal beam are each fixed to a door frame, and the vertical beam is fixed in a cantilever fashion to an intermediate portion of the horizontal beam in an axial direction thereof.

10 Claims, 10 Drawing Sheets

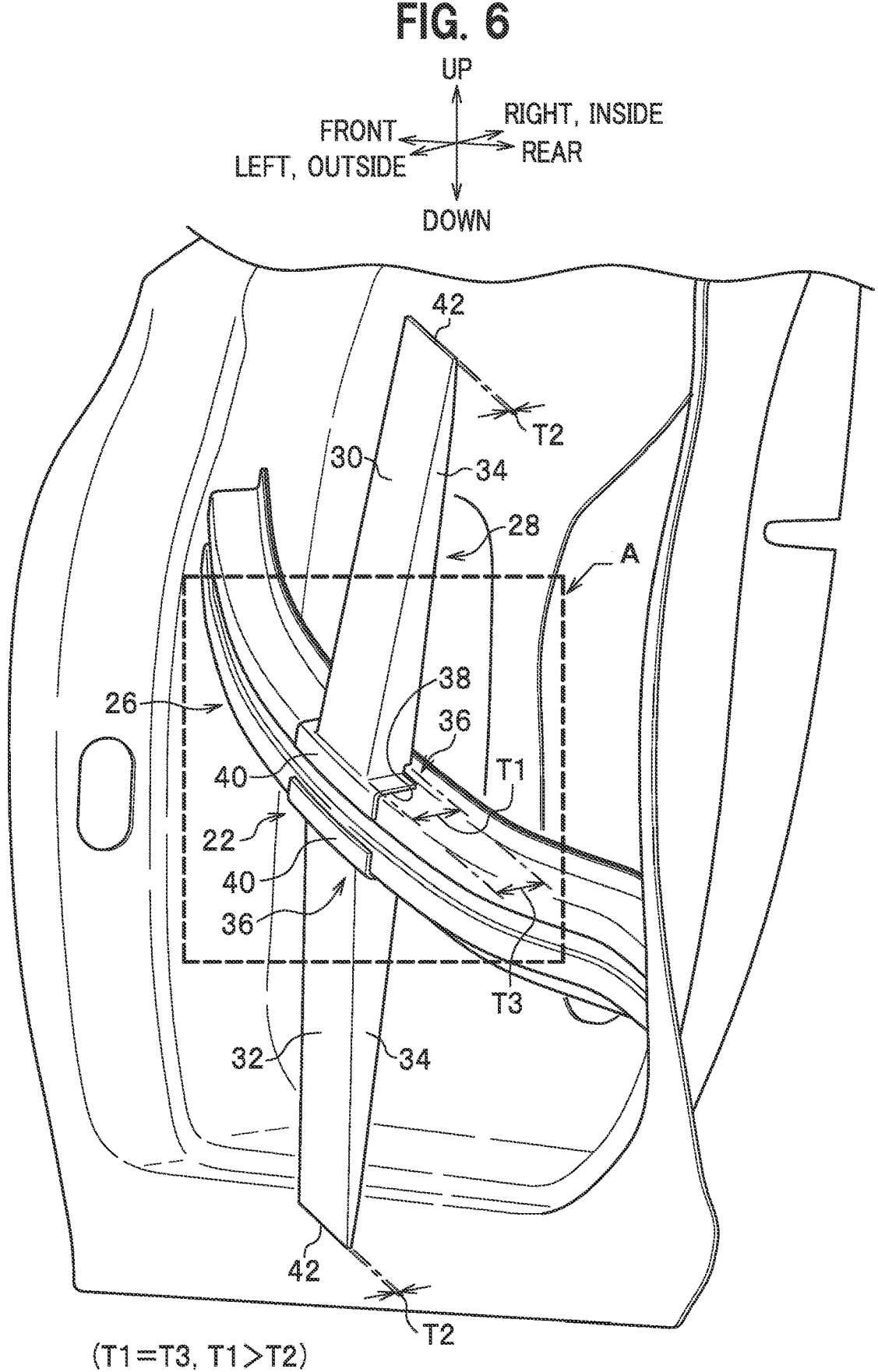

VEHICLE DOOR STRUCTURE

CROSS-REFERENCE TO RELATED APPLICATION

The present application claims the benefit of priority to Japanese Patent Application No. 2021-059323 filed on Mar. 31, 2021, the disclosures of all of which are hereby incorporated by reference in their entireties.

TECHNICAL FIELD

The present disclosure relates to a vehicle door structure incorporating a door beam.

BACKGROUND

For example, JP2015-174575A discloses a beam extending portion extending toward the lower side of a vehicle from a door beam body part which extends along the vehicle front-rear direction.

In the door structure disclosed in JP2015-174575A, the lower end of the beam extending portion is coupled to a lower reinforcement member. This can prevent the beam extending portion of the door beam from being displaced at the time of a side collision.

SUMMARY

With the door structure disclosed in JP2015-174575A, however, when a side collision load is input, it may not be possible to suppress door deformation at a region close to an occupant in the region above the beam body part.

The present disclosure has been made in view of the above problem and provides a vehicle door structure capable of suppressing a side collision load at a region above a horizontal beam extending along the vehicle front-rear direction.

A vehicle door structure according to the present disclosure to achieve the above-described object includes: a horizontal beam arranged inside a door of a vehicle to extend in a vehicle front-rear direction; and a vertical beam arranged inside the door to extend in a vehicle up-down direction, wherein a vehicle front-side end and a vehicle rear-side end of the horizontal beam are each fixed to a door frame, and the vertical beam is fixed in a cantilever fashion to an intermediate portion of the horizontal beam in an axial direction thereof.

According to the present disclosure, a vehicle door structure can be provided, which is capable of suppressing a side collision load at a region above a horizontal beam extending along the vehicle front-rear direction.

BRIEF DESCRIPTION OF THE DRAWINGS

FIG. 6 is a perspective view showing the relationship in thickness between a coupling portion and free ends of a vertical beam;

DETAILED DESCRIPTION

Figure 1:
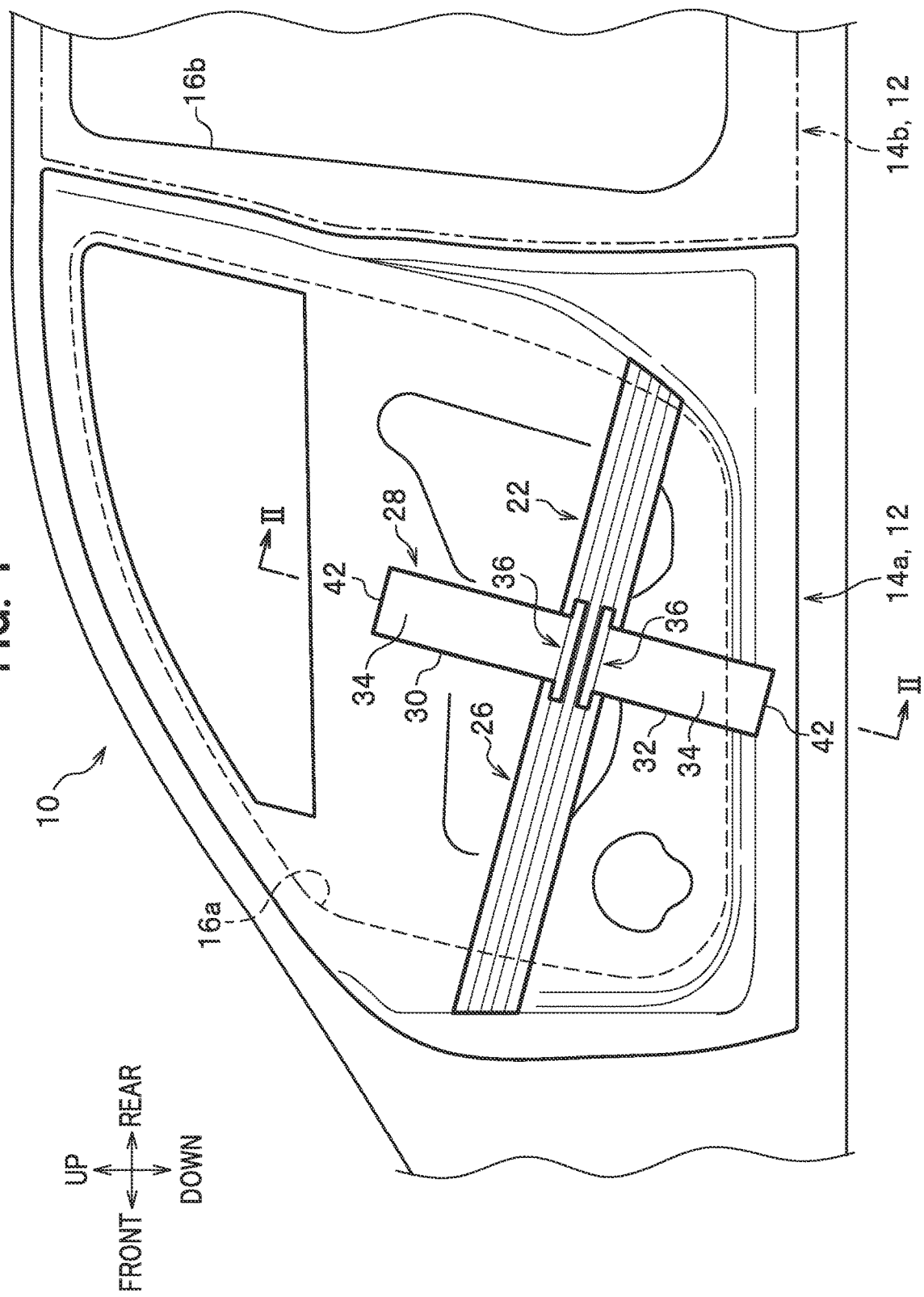
FIG. 1 is a side view of a side of a vehicle body employing a door structure according to an embodiment of the present disclosure.

Next, a description is given of an embodiment of the present disclosure in detail with reference to drawings as appropriate. Note that, in the drawings, "front-rear" represents a vehicle front-rear direction, "left-right" represents a vehicle width direction (left-right direction), and "up-down" represents a vehicle up-down direction (vertically up-down direction).

As shown in FIG. 1, a vehicle employing a door structure according to the embodiment of the present disclosure includes side doors 12 provided at each vehicle body side part 10. These side doors 12 include a front door 14a and a rear door 14b. Note that, in the present embodiment, the side door 12 is described below by taking the front door 14a as an example, and description of the rear door 14b is omitted.

The vehicle body side part 10 is provided with a door opening portion where the side doors 12 are mounted in an openable and closable manner. This door opening portion has a front door opening portion 16a and a rear door opening portion 16b.

Figure 2:
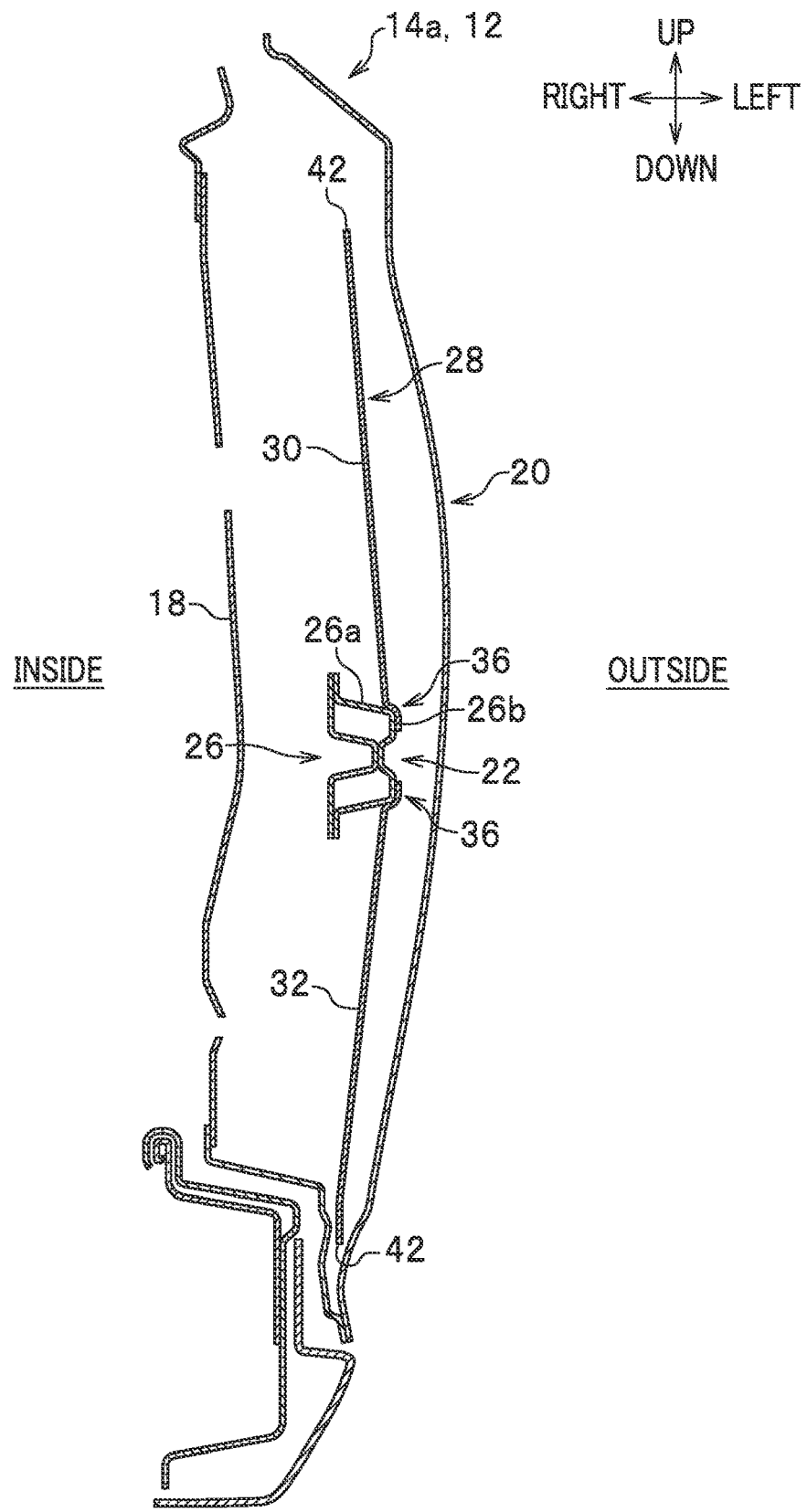
FIG. 2 is a cross-sectional view taken along a line II-II in FIG. 1.
Figure 3:
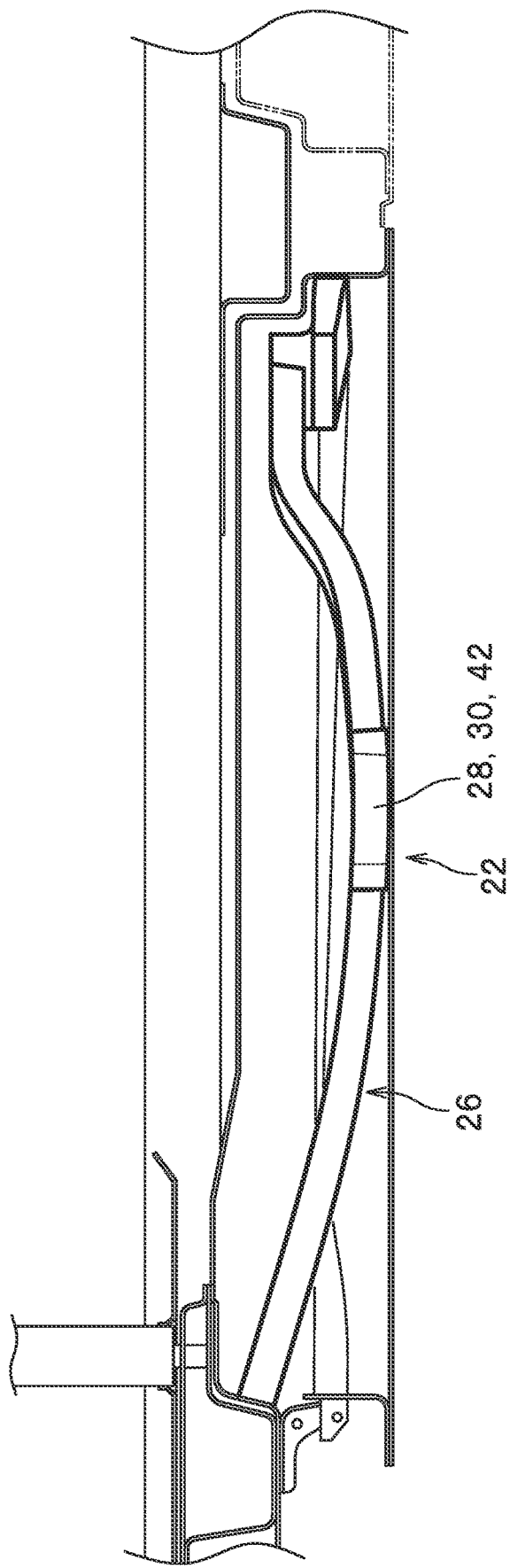
FIG. 3 is a plan view a door beam as viewed from above.

The front door 14a is formed as a door member that opens and closes the front door opening portion 16a. As shown in FIG. 2, this front door 14a includes a door inner panel 18 arranged on the cabin side and functioning as a frame, a door skin 20 (door outer panel) attached to the outer side of the door inner panel 18 in the vehicle width direction, and a door beam 22.

The door beam 22 includes a horizontal beam 26 arranged inside the front door 14a to extend along the vehicle front-rear direction, and a vertical beam 28 arranged inside the front door 14a to extend along the vehicle up-down direction.

The horizontal beam 26 is formed in a curved shape bulging outward in the vehicle width direction in a plan view. The vertical beam 28 is linked to the portion of the horizontal beam 26 at which the horizontal beam 26 bulges farthest in the vehicle width direction in a plan view. Note that an axially perpendicular cross section of the horizontal beam 26 is formed in a composite shape combining two, left and right hat cross sections (see FIG. 2).

As shown in FIG. 1, the vehicle front-side end of the horizontal beam 26 is fixed to the vehicle front-side portion of the door inner panel 18. Also, the vehicle rear-side end of the horizontal beam 26 is fixed to the lower side of the vehicle rear-side portion of the door inner panel 18. The vehicle front-side end and vehicle rear-side end of the horizontal beam 26 may be directly joined to the door inner panel 18 or coupled to it via brackets (not shown).

The vertical beam 28 includes an upper vertical beam extending upward from the horizontal beam 26 and a lower vertical beam 32 extending downward from the horizontal beam 26. The upper vertical beam 30 and the lower vertical beam 32 has the same configuration. Thus, the upper vertical beam 30 is described in detail, and description of the lower vertical beam 32 is omitted.

Figure 4:
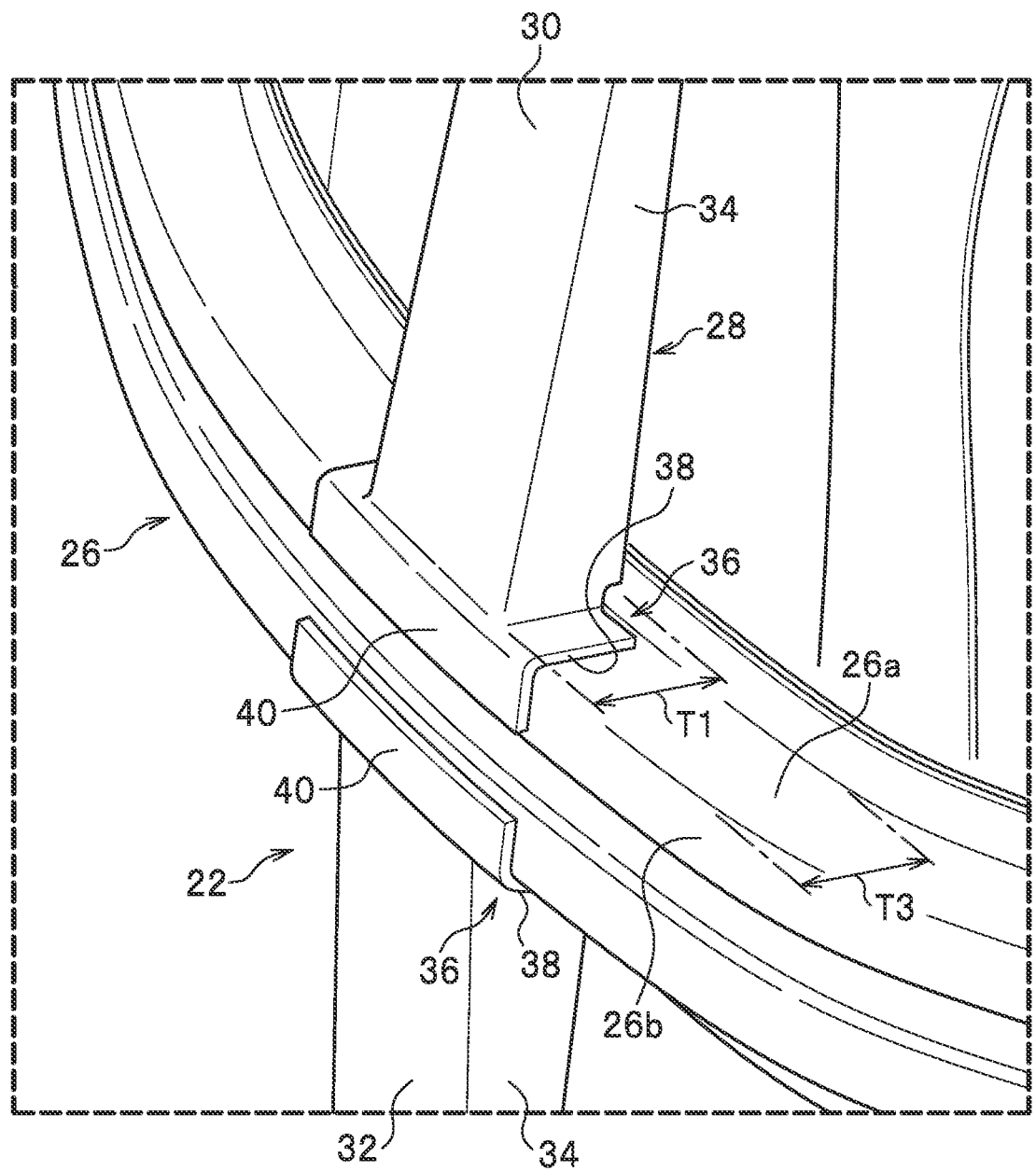
FIG. 4 is an enlarged perspective view of a section A shown in FIG. 6.

As shown in FIGS. 4 and 6, the upper vertical beam 30 includes a beam body portion 34 and a coupling portion (link portion) 36 integrally formed with the beam body portion 34 and provided at the lower end of the beam body portion 34. An axially perpendicular cross section of the beam body portion 34 (a cross section perpendicular to the axis of the upper vertical beam 30) forms a U-cross sectional shape, and the opening portion of the U-cross sectional shape is provided to face inward in the vehicle width direction toward the cabin.

As shown in FIG. 4, the coupling portion 36 forms an L-cross sectional shape, and includes a flat plate portion 38 and a bent portion 40 integrally formed with the flat plate portion 38 and bent downward substantially perpendicularly from the outer end of the flat plate portion 38 in the vehicle width direction.

The dimension of the flat plate portion 38 in the vehicle front-rear direction is larger than the dimension of the lower end of the beam body portion 34 in the vehicle front-rear direction. The flat plate portion 38 is joined to an upper face 26a of the horizontal beam 26, and the bent portion 40 is joined to an outer side face 26b of the horizontal beam 26 in the vehicle width direction. In this way, the coupling portion 36 of the upper vertical beam 30 is joined (linked) to at least two adjacent side faces of the horizontal beam 26 (upper face 26a and outer side face 26b in the vehicle width direction). The same is applied to the lower vertical beam 32.

The upper vertical beam 30 and the lower vertical beam 32 forming the vertical beam 28 are each fixed to a center portion of the horizontal beam 26 in the axial direction in a cantilever fashion via the coupling portion 36. Note that, in the present embodiment, a case of fixing the vertical beam 28 to the center portion of the horizontal beam 26 in the axial direction has been exemplarily shown. However, the present embodiment is not limited thereto. The vertical beam 28 only needs to be fixed to an intermediate portion of the horizontal beam 26 in the axial direction.

The upper vertical beam 30 and the lower vertical beam 32 forming the vertical beam 28 are fixed (supported) to the horizontal beam 26 in a cantilever fashion, so that the upper end and the lower end of the vertical beam 28 in the axial direction are each a free end 42. This "free end 42" may not come in contact with the surrounding elements at all and may come in contact with the surrounding elements to such an extent so as not to obstruct rotation of the horizontal beam 26 when a side collision load is input.

Figure 5:
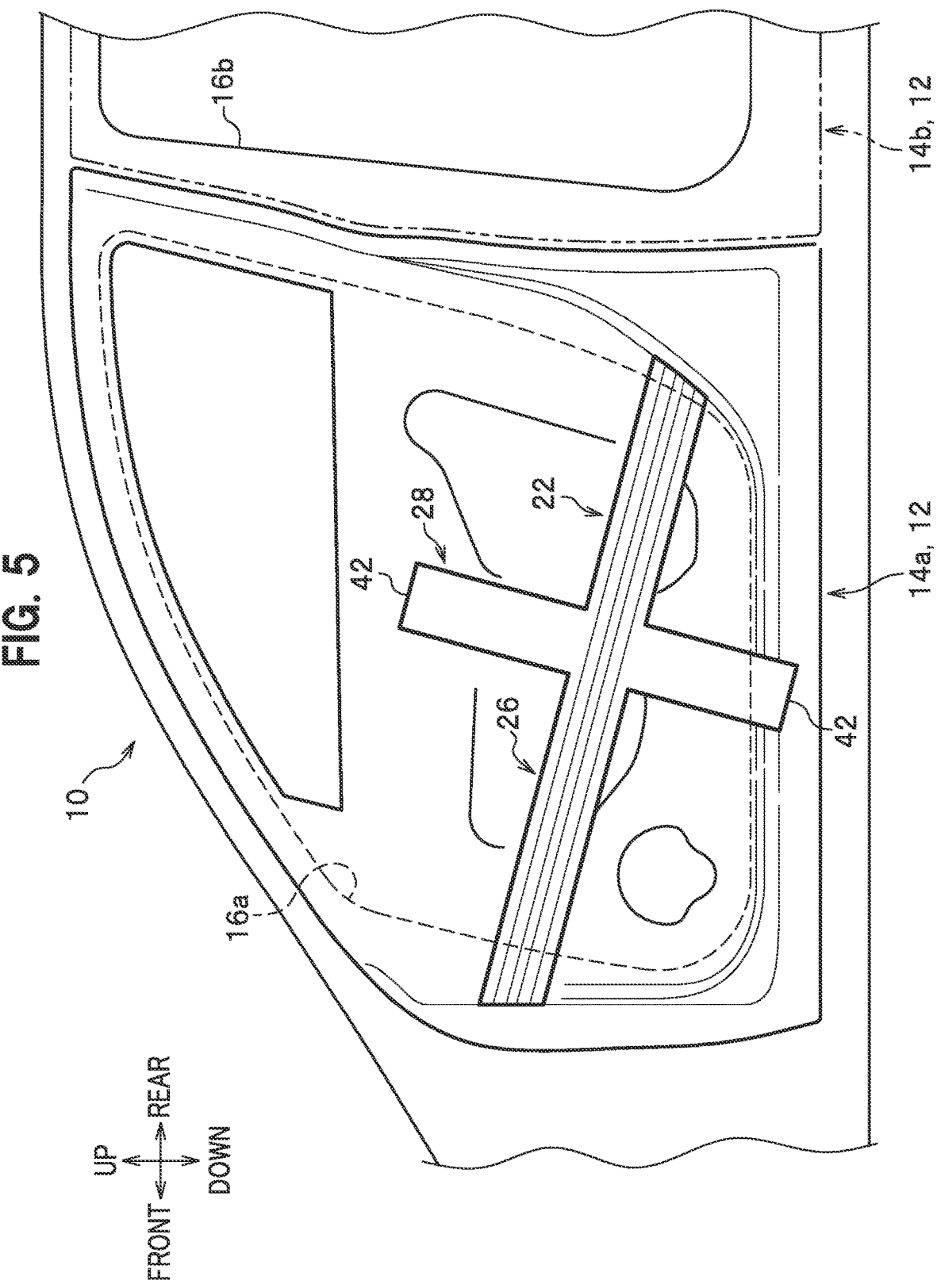
FIG. 5 is a side view of a vehicle body side part having a door beam according to a modification.

Note that, in the present embodiment, the vertical beam 28 includes the upper vertical beam 30 and the lower vertical beam 32 formed as separate components in the up-down direction, but the present embodiment is not limited thereto. For example, as shown in a modification in FIG. 5, the vertical beam 28 and the horizontal beam 26 may be formed integrally with each other. By integrally forming the vertical beam 28 and the horizontal beam 26 as described above by, for example, a mold or a pressing device, the vertical beam 28 and the horizontal beam 26 can be easily rotated together when a side collision load is input to a lower portion of the vertical beam 28, and a reaction force to the side collision load can thus be easily generated at an upper portion of the vertical beam 28.

As shown in FIGS. 4 and 6, the thickness (T1) of the vertical beam 28 in the vehicle width direction at each coupling portion 36 coupled to the horizontal beam 26 is equal to the thickness (T3) of the horizontal beam 26 in the vehicle width direction (T1=T3). Also, the thickness (T2) of the vertical beam 28 in the vehicle width direction at each free end 42 (end) is smaller than the thickness (T1) of the vertical beam 28 at the coupling portion 36 coupled to the horizontal beam 26 (T1>T2).

Note that, in the present embodiment, the upper vertical beam 30 and the lower vertical beam 32 forming the vertical beam 28 are arranged coaxially with each other, but the present embodiment is not limited thereto. For example, the upper vertical beam and the lower vertical beam may not be coaxial with each other and may be coupled to the horizontal beam 26 at positions offset from each other in the vehicle front-rear direction.

By arranging the upper vertical beam and the lower vertical beam at positions shifted from each other in the vehicle front-rear direction as described above, the vertical beams (upper vertical beam and lower vertical beam) can be arranged on the upper side and the lower side of the horizontal beam 26 at respective optimal positions for suppressing deformation of the door panel (door inner panel 18 and door skin 20) when a side collision load is input.

Each side door 12 employing the door structure according to the present embodiment is basically configured as described above. Next, advantageous effects thereof are described.

First, actions of the vertical beam 28 in response to input of a side collision load F are described.

Figure 7A:
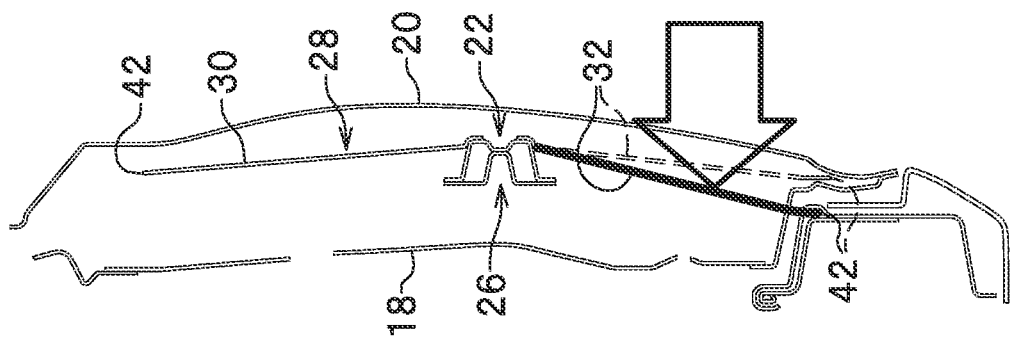
FIGS. 7A to 7C are each explanatory view showing an action of the vertical beam in response to input of a side collision load.
Figure 7B:
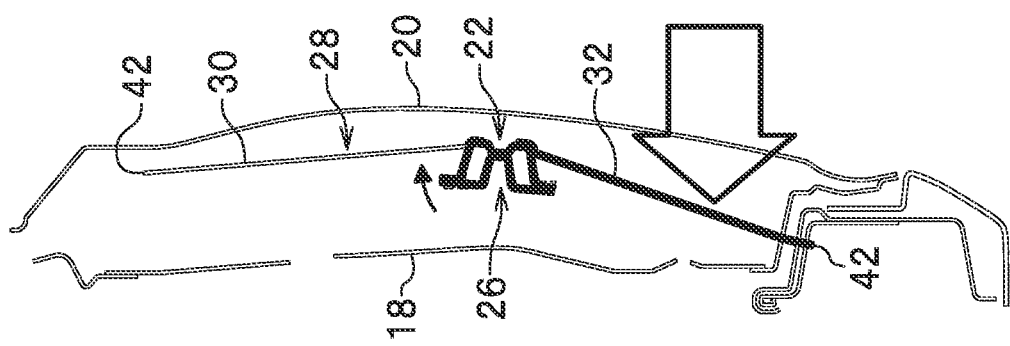
Figure 7C:
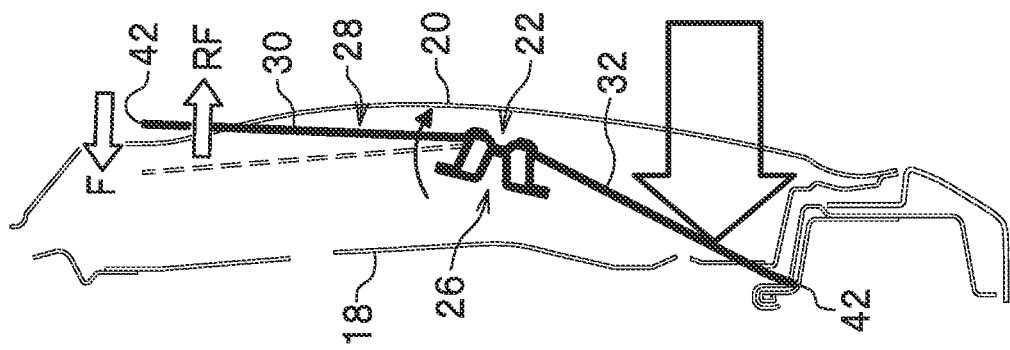

FIGS. 7A to 7C are each explanatory view showing an action of the vertical beam in response to input of a side collision load.

As shown in FIG. 7A, when the side collision load F is input to the side door 12, a barrier (not shown) gets displaced inward in the vehicle width direction. As a result, the door skin 20 is pressed inward in the vehicle width direction, and the lower vertical beam 32 of the vertical beam 28 is pressed inward in the vehicle width direction (toward the cabin) and thus gets deformed.

Subsequently, as shown in FIG. 7B, as the barrier (not shown) gets displaced further inward in the vehicle width direction, the horizontal beam 26, whose vehicle front-side end and vehicle rear-side end are fixed to the door inner panel 18, gets deformed while being rotated in the clockwise direction (the direction indicated by an arrow).

As shown in FIG. 7C, as the barrier (not shown) gets displaced further inward in the vehicle width direction from the state of FIG. 7B, the upper vertical beam 30 of the vertical beam 28 attempts to rotate toward the outside of the vehicle due to the rotational action of the horizontal beam 26, so that a reaction force RF to the displacement of the barrier (not shown) is generated. The reaction force RF generated at the upper vertical beam 30 of the vertical beam 28 and the side collision load F due to the displacement of the barrier (not shown) are generated in opposite directions. Accordingly, this reaction force RF reduces the side collision load F.

In the present embodiment, the vertical beam 28 arranged inside the side door 12 to extend in the up-down direction is fixed in a cantilever fashion to the center portion of the horizontal beam 26, whose vehicle front-side end and vehicle rear-side end are fixed to the door inner panel 18.

In the present embodiment, for example, when a side collision load is input to a portion lower than the horizontal beam 26, the vertical beam 28 above the horizontal beam 26 rotates outward in the vehicle width direction, thereby outputting a reaction force to a colliding object. With the collision with the colliding object, the vertical beam 28 gets deformed or the colliding object gets deformed. Accordingly, the side collision load can be absorbed. Thus, in the present embodiment, a side collision load input to a region above the horizontal beam 26 extending in the vehicle front-rear direction can be suitably suppressed.

Note that, in the present embodiment, the vertical beam 28 is supported on the horizontal beam 26 in a cantilever fashion, so that the horizontal beam 26 is easily rotated outward in the vehicle width direction when a side collision load is input.

Also, in the present embodiment, the upper end and the lower end of the vertical beam 28 in the axial direction are the free ends 42 out of contact with the surrounding elements. In the present embodiment, the upper end and lower end of the vertical beam 28 are the free ends 42 out of contact with the surrounding elements, so that the vertical beam 28 can rotate and output a rection force to a colliding object. Note that these free ends 42 may come in contact with the surrounding elements to such an extent so as not to obstruct the rotation of the vertical beam 28 when a side collision load is input.

Further, in the present embodiment, the coupling portion (link portion) 36 of the upper vertical beam 30 (lower vertical beam 32) forming the vertical beam 28 is joined to two adjacent side faces of the horizontal beam 26 (upper face 26a and outer side face 26b in the vehicle width direction). Thus, in the present embodiment, the vertical beam 28 and the horizontal beam 26 can be firmly linked to each other. Accordingly, when a side collision load is input to the lower vertical beam 32 of the vertical beam 28, the vertical beam 28 and the horizontal beam 26 can rotate together. This generates a reaction force to the side collision load at the upper vertical beam 30 of the vertical beam 28.

Furthermore, in the present embodiment, the vertical beam 28 includes the upper vertical beam 30 extending upward from the horizontal beam 26 and the lower vertical beam 32 extending downward from the horizontal beam 26. Thus, the present embodiment, including the upper vertical beam 30 and the lower vertical beam 32 enables the vertical beam 28 to be arranged on the upper side and the lower side of the horizontal beam 26 at respective optimal positions for suppressing deformation of the door panel (door inner panel 18 and door skin 20) when a side collision load is input. Also, the plate thicknesses and the material can be optimized for the upper vertical beam 30 and the lower vertical beam 32. Further, the upper vertical beam 30 and the lower vertical beam 32 can be easily formed by using, for example, a mold or the like.

In the present embodiment, the vertical beam 28 is linked to the portion of the horizontal beam 26 at which the horizontal beam 26 bulges farthest outward in the vehicle width direction in a plan view. Thus, in the present embodiment, the upper portion of the vertical beam 28 can be displaced farther outward in the vehicle width direction and a larger reaction force can therefore be generated. Accordingly, in the present embodiment, this larger reaction force improves the side collision load absorption performance, to suppress deformation of the side door 12.

Furthermore, in the present embodiment, the thickness (T1) of the vertical beam 28 in the vehicle width direction at each coupling portion 36 coupled to the horizontal beam 26 is equal to the thickness (T3) of the horizontal beam 26 in the vehicle width direction (T1=T3). Thus, in the present embodiment, the strength of the vertical beam 28 at the coupling portion 36 coupled to the horizontal beam 26 is also ensured to be equal to the strength of the horizontal beam 26.

Furthermore, in the present embodiment, the thickness (T2) of the vertical beam 28 in the vehicle width direction at each free end 42 (end) is smaller than the thickness (T1) of the vertical beam 28 at the coupling portion 36 coupled to the horizontal beam 26 (T1>T2). Thus, in the present embodiment, the vertical beam 28 can be arranged to ends of the door panel of the side door 12 without having to increase the thickness of the door panel.

Furthermore, in the present embodiment, a cross section of the vertical beam 28 perpendicular to the axis thereof is formed in a U-cross sectional shape with an opening toward the cabin. Thus, in the present embodiment, the reaction force input face and the reaction force output face can made large. Also, the vertical beam 28 can be formed easily.

Next, a description is given of modifications of the present embodiment below.

Figure 8:
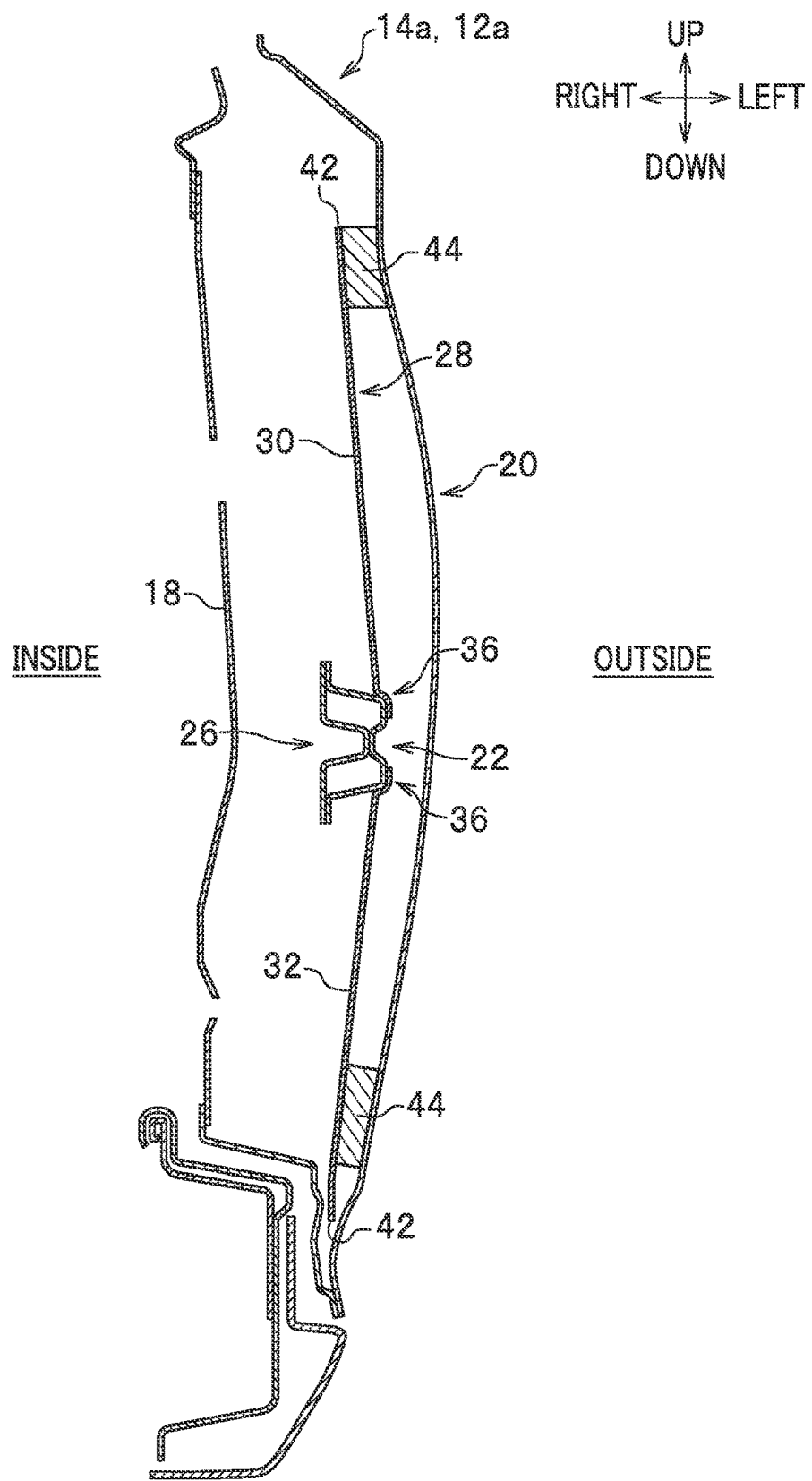
FIG. 8 is a cross-sectional view corresponding to FIG. 2 in which a door structure according to a first modification is employed.

As shown in FIG. 8, in a side door 12a according to a first modification, the upper end (free end 42) of the upper vertical beam 30 and the lower end (free end 42) of the lower vertical beam 32 are each in contact with a cushioning member 44 arranged inside the side door 12a. The contact with the cushioning member 44 can prevent noise due to vibration. Note that it suffices that at least one of the upper end and the lower end be in contact with the cushioning member 44.

Figure 9:
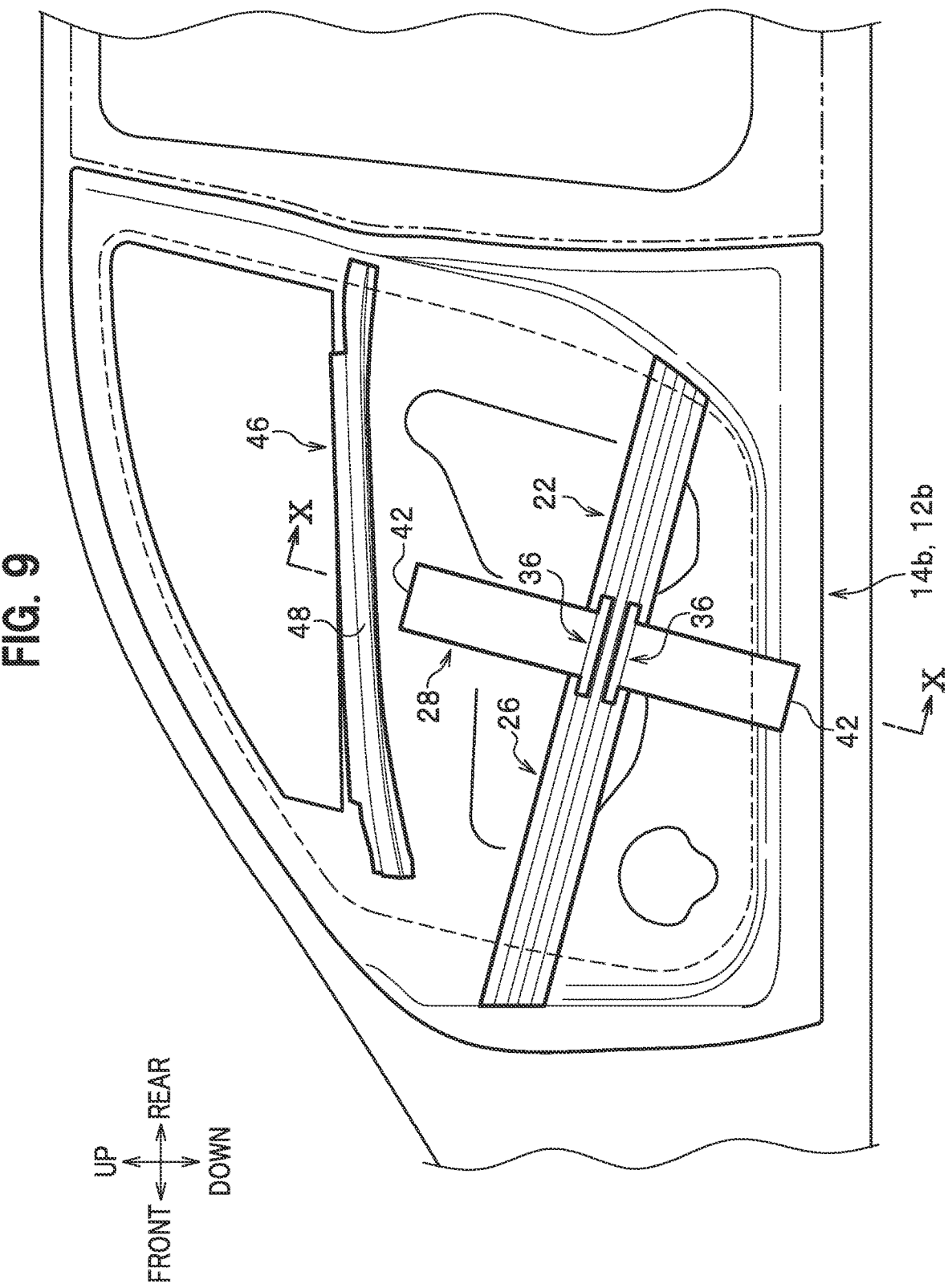
FIG. 9 is a side view corresponding to FIG. 1 to show a vehicle body side part employing a door structure according to a second modification.
Figure 10:
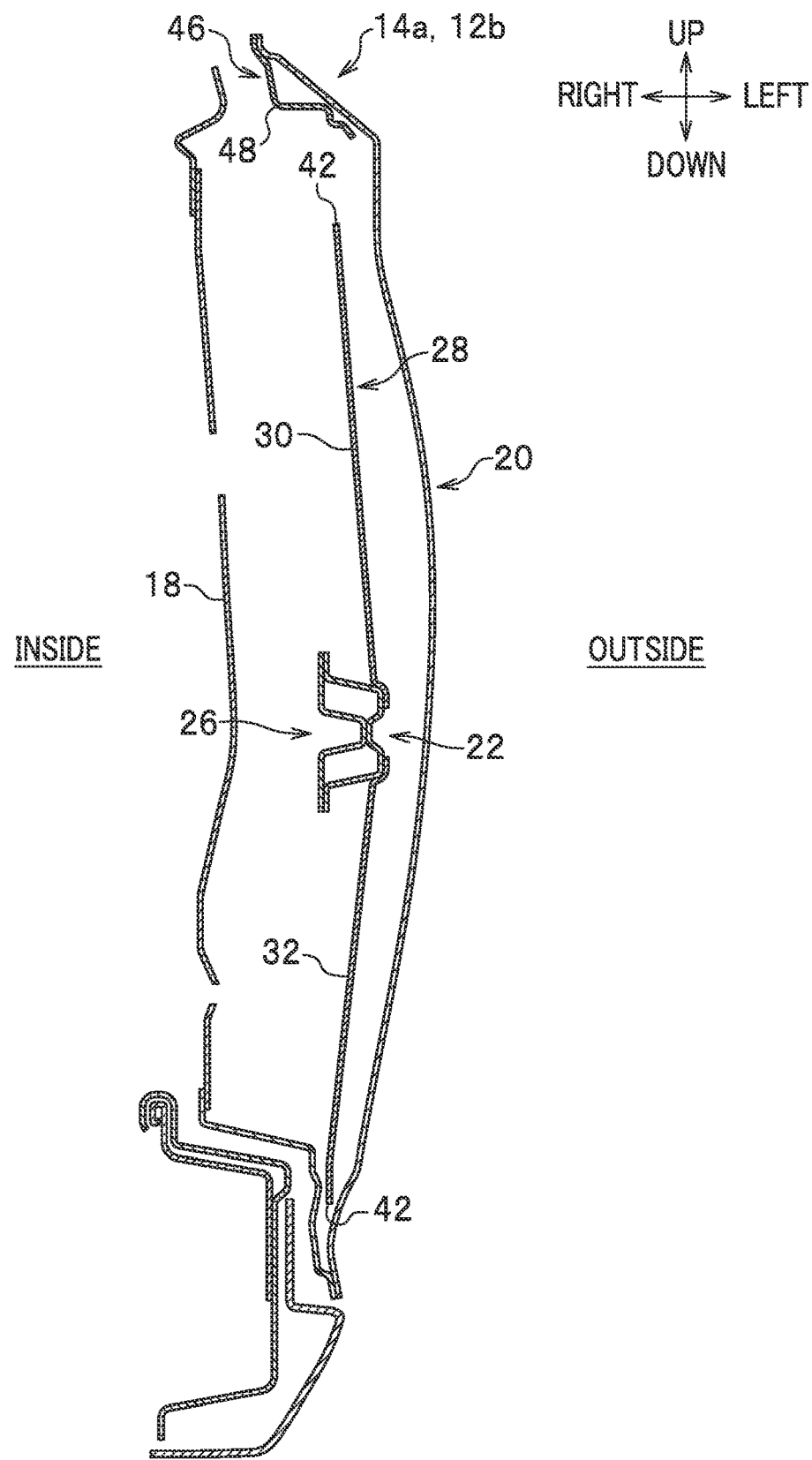
FIG. 10 is a cross-sectional view taken along a line X-X in FIG. 9.

As shown in FIGS. 9 and 10, in a side door 12b according to a second modification, the upper end (free end 42) of the upper vertical beam 30 in the axial direction is arranged to be lower than a door-skin upper stiffener 48, extending in the vehicle front-rear direction, of a belt line part 46. In this way, the free end 42 of the upper vertical beam 30 can rotate without interfering with the door-skin upper stiffener 48 when a side collision load is input.

What is claimed is:

1. A vehicle door structure comprising:
a horizontal beam arranged inside a door of a vehicle to extend in a vehicle front-rear direction; and
a vertical beam arranged inside the door to extend in a vehicle up-down direction, wherein
a vehicle front-side end and a vehicle rear-side end of the horizontal beam are each fixed to a door frame,
the vertical beam includes an upper vertical beam extending upward from the horizontal beam and a lower vertical beam extending downward from the horizontal beam,
the upper vertical beam and the lower vertical beam each are fixed in a cantilever fashion to an intermediate portion of the horizontal beam in an axial direction thereof,
the upper vertical beam and the lower vertical beam each includes a beam body portion and a coupling portion provided at an end of the beam body portion,
the coupling portion forms an L-cross sectional shape, and includes a flat plate portion and a bent portion integrally formed with the flat plate portion and bent in the vehicle up-down direction substantially perpendicularly from the outer end of the flat plate portion in the vehicle width direction,
a dimension of the flat plate portion in the vehicle front-rear direction is larger than a dimension of the end of the beam body portion in the vehicle front-rear direction,
the flat plate portion is joined to an upper face and a lower face of the horizontal beam, respectively, and the bent portion is joined to an outer side face of the horizontal beam in the vehicle width direction.

2. The vehicle door structure according to claim 1, wherein an upper end and a lower end of the vertical beam in an axial direction thereof are each a free end out of contact with a surrounding element.

3. The vehicle door structure according to claim 1, wherein the vertical beam is linked to at least two adjacent side faces of the horizontal beam.

4. The vehicle door structure according to claim 1, wherein the vertical beam is formed integrally with the horizontal beam.

5. The vehicle door structure according to claim 1, wherein
the horizontal beam has a curved shape bulging outward in a vehicle width direction, and
the vertical beam is linked to a portion of the horizontal beam at which the horizontal beam bulges farthest outward in the vehicle width direction in a plan view.

6. The vehicle door structure according to claim 1, wherein
a thickness of the vertical beam in a vehicle width direction at a link portion thereof linked to the horizontal beam is equal to a thickness of the horizontal beam in the vehicle width direction, and
a thickness of the vertical beam in the vehicle width direction at an end thereof is smaller than the thickness of the vertical beam at the link portion linked to the horizontal beam.

7. The vehicle door structure according to claim 1, wherein a cross section of the vertical beam perpendicular to an axis thereof is formed in a U-cross sectional shape with an opening toward a cabin.

8. The vehicle door structure according to claim 1, wherein at least one of an upper end or a lower end of the vertical beam is in contact with a cushioning member arranged inside the door.

9. The vehicle door structure according to claim 1, wherein an upper end of the vertical beam in an axial direction thereof is arranged to be lower than a door-skin upper stiffener, extending in the vehicle front-rear direction, of a belt line part.

10. The vehicle door structure according to claim 1, wherein the upper vertical beam and the lower vertical beam are not coaxial with each other and are linked to the horizontal beam at positions offset from each other in the vehicle front-rear direction.

* * * * *